United States Patent [19]

Barnett

[11] 4,126,703

[45] Nov. 21, 1978

[54] ANIMAL FEED SYSTEM

[75] Inventor: Dil G. Barnett, Cedartown, Ga.

[73] Assignee: Collard Valley Research, Inc., Carrolton, Ga.

[21] Appl. No.: 794,402

[22] Filed: May 6, 1977

[51] Int. Cl.$^2$ ................................................ A23K 1/00
[52] U.S. Cl. .......................................... 426/2; 426/74; 426/623; 426/630; 426/636; 426/807
[58] Field of Search ..................... 426/2, 74, 807, 623, 426/630, 635, 636, 807

[56] References Cited

U.S. PATENT DOCUMENTS 3,687,680   8/1972   Krchnavi et al. .......................... 426/2

OTHER PUBLICATIONS

Rose et al., "Condensed Chemical Dictionary," Van Nostrand Publishers 1970, pp. 193–194.
Morrison, "Putting Research to Work," Feedstuffs, vol. 36, Dec. 1976.

*Primary Examiner*—R. B. Penland
*Attorney, Agent, or Firm*—Jones, Thomas & Askew

[57] ABSTRACT

A food substance for ruminating animals, such as cattle, is formed from a mixture of fibrous plant materials in chopped and ground form and precipitate dust from the manufacture of portland cement.

8 Claims, No Drawings

ANIMAL FEED SYSTEM

BACKGROUND OF THE INVENTION

The nutrient requirements for animals, particularly those animals of the type raised for food, such as beef cattle, have been studied in substantial detail so as to determine how much food and what types of foods should be supplied to the animals in order to achieve a desired rate of growth. One such study is reported in a publication by The National Academy of Sciences, entitled "Nutrient Requirements of Beef Cattle" (5th Revised Edition, 1976, No. 4), wherein the body weight of beef cattle is compared with a daily average gain in weight, daily dry matter ingested by the animals, and a listing of required protein, calcium, phosphorous, carotene, and vitamin A for the growth rate. The cattle classes listed included "Finishing Steer Calves", "Finishing Yearling Steers", "Finishing Two-Year Old Steers", "Finishing Heifer Calves" and others. Other sources provided nutrient values for various foods, such as Fescue hay, corn grain, soybean meal, etc. With a use of information of this type, precise amounts of food substances can be provided to cattle for an expected daily growth rate.

Various diet buffers and additives also have been developed for beef cattle and other animals which cause the animals to have a growth rate faster than they ordinarily would have on a given diet. For example, limestone has been added to the cattle feed which would comprise, for example, various hay and grains, and possibly molasses, salt and vitamins. Also, commercially sold products such as a product sold under the trade name RU-MIN-AID have been used as buffers or diet supplements. This product is believed to include calcium and magnesium and is believed to increase the ability of the ruminant animal to digest its food.

Animal research indicates that when the pH level of the digestant in the small intestines of beef cattle approaches 6.9, the animal is able to benefit more from the food substance, apparently by absorbing more of the nutrient value of its food. For example, when the pH level of the substance in the small intestines of beef cattle approaches 6.9, there is significantly less starch in the feces of the animal than when the pH level is lower. It is known that the bovine pancreatic alpha amylase do not function as well to digest the starch in the animal's food when the pH level of the food is substantially lower than 6.9. Research also indicates that some of the compounds mentioned above are effective in raising the pH level in the rumen and in the intestines of beef cattle.

In the manufacture of portland cement, the materials used to form the cement include limestone and clay, and the materials are ground together and raised to a high temperature in a kiln, in some instances up to about 2700° F. The extreme heat in the kiln appears to cause the aluminum, calcium, magnesium, potassium and sodium to hydrate into hydroxide forms. During the heating process, a substantial amount of dust is given off, and in the past, the dust has been allowed to escape to the atmosphere. In more recent years, a substantial amount of the dust escaping from the cement manufacturing process has been extracted as a precipitate from the exhaust stacks of kilns, and treated as a waste product, usually by burying in pits or by dumping in rivers, etc. There appears to be no practical and profitable use for the precipitate dust from the manufacture of portland cement.

SUMMARY OF THE INVENTION

Briefly described, the present invention comprises a food substance for ruminating animals such as beef cattle and the like, which comprises a mixture of fibrous plants in dry particulate form, such as chopped and/or ground fibrous plants, and precipitate dust from the manufacture of portland cement. The dust can be mixed with the typical dried food substances for the animal, including Fescue hay, Timothy hay, corn grain, and other additives such as molasses, soybean meal, dicalcium phosphate, limestone, mineral salt and vitamins. These substances can be in particle form, such as in chopped, ground or cracked form, and the precipitate dust is thoroughly mixed with the ingredients to form a substantially uniform blend of materials. If it is determined that the pH level of an animal feces is lower than desired, an increased amount of the precipitate dust can be added to the diet of the animal, and the pH level of the animal feces is likely to increase, which indicates that the pH level in the rumen and in the intestines of the animal is also increased. Thus, the ability of the animal to benefit from its food intake, apparently by absorbing more nutrient value of its food, can be controlled by controlling the volume of precipitate dust in the animal's diet. Also, it appears that the pH level in the rumen and intestines of the animal is not only raised but remains at a high level for a length of time longer than when various diet additives and buffers are used in the diet of the animal.

Thus, it is an object of this invention to provide a food substance for ruminating animals such as beef cattle which increases the growth rate of the animal.

Another object of this invention is to provide a food substance for animals which controls the pH level of the digestant in the animals' gastro-intestinal tract.

Another object of this invention is to provide a food substance for animals which controls the amount of starch in the feces of the animal.

Another object of this invention is to provide a food substance for animals which increases the animal's ability to absorb the nutrients of its food.

Other objects, features and advantages will become apparent upon reading the following specification.

DETAILED DESCRIPTION

Precipitate dust from the manufacture of portland cement is mixed in dry form with dried food substances for feeding to a ruminating animal such as beef cattle. The precipitate dust is rejected material from a rotary kiln in which cement raw materials such as limestone and clay are ground together and heated, for example, to a temperature of 2700° F. The dust emerges from the heating and grinding process in the form of "smoke" and the dust is extracted from the exhaust gases as a precipitate.

The food substance is formed from chopped, ground or cracked fibrous vegetable materials and the precipitate dust is added to the materials in dry form and mixed together with the materials and fed to the animals.

EXAMPLE

During the year 1977 a feeding trial was initiated with 14 steers of similar age and weighing from 705 to 800 pounds. These steers were from three different breeds: 8 Angus, 4 Holstein and 2 Charolais. Steers were paired on the basis of breed, body weight and body type score. Animals within pairs were assigned randomly to one of two diets (Table 1). Each group of steers was housed in adjacent feeding areas with identical climatic conditions, feeding devices, exercise areas and management systems. The feed ingredients (Table 1) were blended to provide complete mixed diets which are available on an ad libitum basis at all times. A seven day period was used to adjust steers to the experimental diets prior to the start of the experiment.

TABLE 1

Ingredient and Chemical Composition of Diets[1]

| Ingredient | Group I Diet (no dust) % | Group II Diet (dust included) % |
|---|---|---|
| Fescue hay (ground) | 26.1 | 25.8 |
| Timothy hay (ground) | 26.1 | 25.8 |
| Corn grain (cracked) | 36.0 | 35.8 |
| Molasses | 9.0 | 9.0 |
| Soybean meal (44% CP) | 1.9 | — |
| Dicalcium phosphate | .1 | — |
| Limestone | .3 | — |
| Trace mineral salt[2] | .4 | — |
| Precipitate dust | — | 3.6 |
| Vitamin premix[3] | .1 | — |
| | 100.00% by weight | 100.00% by weight |
| Chemical Analysis | % | |
| Crude protein | 10.69 | 8.68 |
| Calcium | .44 | .91 |
| Phosphorus | .31 | .28 |

[1] All values are on a dry-matter basis.
[2] Guaranteed to contain not less than .50% zinc, .40% manganese, .25% iron, .05% copper, .01% iodine and .01% cobalt.
[3] Supplied 1500 I.U. vitamin A and 150 I.U. vitamin D per lb. of complete diet.

TABLE 2

| | Group I Diet (no dust) | Group II Diet (dust included) |
|---|---|---|
| Average daily feed intake | 1.94 | 1.93 |
| Average daily weight gain | 1.65 | 2.53 |
| Feed/gain ratio | 8.01 | 5.12 |
| Fecal pH | 5.81 | 7.09 |
| Fecal starch | 23.5 | 2.3 |

TABLE 3

| | Group I Diet (no dust) | Group II Diet (dust included) |
|---|---|---|
| Average daily feed intake | 2.21 | 1.98 |
| Average daily weight gain | 2.25 | 3.07 |
| Feed/gain ratio | 7.31 | 5.23 |
| Fecal pH | 6.09 | 7.01 |
| Fecal starch | 23.5 | 2.4 |

TABLE 4

| | Group I Diet (no dust) | Group II Diet (dust included) |
|---|---|---|
| Average daily feed intake | 2.24 | 2.41 |
| Average daily weight gain | 2.52 | 3.01 |
| Feed/gain ratio | 6.93 | 5.07 |
| Fecal pH | 6.11 | 6.73 |
| Fecal starch | 21.42 | 5.93 |

TABLE 5

| | Group I Diet (no dust) | Group II Diet (dust included) |
|---|---|---|
| Average daily feed intake | 2.24 | 3.27 |
| Average daily weight gain | 2.55 | 4.71 |
| Feed/gain ratio | 7.44 | 5.93 |
| Fecal pH | 6.07 | 6.89 |
| Fecal starch | 22.26 | 4.98 |

TABLE 6

In Vitro Digestible Dry Matter Values

| | Group I Diet (no dust) | Group II Diet (dust included) |
|---|---|---|
| Digestible Dry Matter (%) | | |
| 6 hours | 25.7 | 29.2 |
| 24 hours | 42.1 | 49.8 |
| 72 hours | 68.3 | 70.2 |

The "Average daily feed intake" of Tables 2-5 is a measure of the weight of feed consumed over the period for all of the steers divided by the total body weight of the steers at the start of the period and converted to a daily percentage. For example, ten 800 pound steers consuming a total of 160 pounds of feed per day would have a feed intake of 2.0. The "average daily weight gain" is the total weight gain of all the steers over the period divided by the total of the number of steers and the number of days in the period. The "feed/gain ratio" is the weight of feed consumed by all of the steers during the period divided by the weight gained by all of the steers. The "Fecal pH" is a measure of the acid in the feces of the steers in each group. The "Fecal starch" is a measure of the starch in the feces of the steers in each group.

The first calculated results (Table 2) were for a period of seven consecutive days and show that during this period there was virtually no difference in level of average daily feed intake between the two groups of cattle. However, the average daily weight gain of the cattle and feed-to-gain ratio data shows that the group of cattle on the dust diet gained about one and one-half as much weight per day as the cattle in the other group, and that the feed/gain ratio was only about 64 percent of the other group. This suggests that the steers to which the dust diet was fed apparently were more efficient in utilizing the feed consumed. Fecal pH of the group on the dust diet was higher by 1.29 units while there was a considerable reduction in the amount of starch appearing in the feces of steers fed the dust diet. Based on previous data published for limestone buffered diets, these findings indicate that the dust material buffered the intestinal pH to near 6.9 which is believed to be the optimum for the most efficient activity of bovine pancreatic alpha amylase.

The diets were continued under the same conditions for subsequent consecutive periods of seven days, and Tables 3, 4 and 5 show the results for each consecutive seven day period.

A limited number of in vitro digestion studies were conducted to determine if the precipitate dust diet has any influence on reticulo-rumen (fore stomach) utilization of dietary dry matter. The date (Table 7) indicate that dietary dry matter was digested from 3.5 to 7.7 percentage units faster during the first 24 hours of fermentation for the dust diet when compared to the standard controlled diet. These findings in conjunction with data from the feeding trial suggests the dust material not only influences intestinal utilization of dietary nutrients, but also has a stimulating effect on reticulo-rumen digestive capacity.

Other diets which included the dust have been fed to cattle and similar weight gains have resulted. One such diet included a mixture of ground ear corn and soybean straw with the precipitate portland cement dust additive.

While this invention has been described in detail with particular reference to a preferred embodiment thereof, it will be understood that variations and modifications can be effected within the spirit and scope of the invention as described hereinbefore and as defined in the appended claims.

I claim:

1. A dry feed ration for ruminant animals comprising a mixture of about 52% by weight of fibrous forage plants, about 36% by weight of grain concentrate and up to about 3.6% by weight of dry precipitate dust from the manufacture of portland cement, said ration having a crude protein content of as low as about 8% by weight.

2. The food substance of claim 1 and wherein the fibrous forage plants comprise chopped soybean straw and ground ear corn.

3. The food substance of claim 1 and wherein the fibrous forage plants comprise Fescue hay, Timothy hay and cracked corn grain.

4. The food substance of claim 1 wherein the fibrous forage plants comprise approximately 26 percent by weight of ground Fescue hay, approximately 26 percent by weight of ground Timothy hay, and approximately 36 percent of cracked corn grain.

5. The food substance of claim 1 and wherein the precipitate dust comprises aluminum hydroxide, calcium hydroxide, magnesium hydroxide, potassium hydroxide and sodium hydroxide.

6. The dried feed ration of claim 1 wherein the plant material and the precipitate dust are mixed together in dry form and maintained in dry form until indigested by the animal.

7. A method of maintaining the pH level in the intestines of ruminant animals comprising feeding said animals a dry food substance comprising a mixture of about 52% by weight fibrous forage plants, about 36% by weight grain concentrate and up to 3.6% by weight of dry precipitate dust from the manufacture of portland cement said ration having a crude protein content as low as about 8% by weight.

8. A method of reducing the starch in the feces of ruminant animals comprising feeding said animals a dry food substance comprising a mixture of about 52% by weight fibrous forage plants, about 36% by weight grain concentrate and up to 3.6% by weight of dry precipitate dust from the manufacture of portland cement said ration having a crude protein content as low as about 8% by weight.

* * * * *